Patented May 5, 1936

2,039,529

UNITED STATES PATENT OFFICE 2,039,529

RUBBER PRODUCTS

Roland H. Guinzburg, Flushing, N. Y., assignor to I. B. Kleinert Rubber Company, New York, N. Y.

No Drawing. Application March 1, 1934, Serial No. 713,526

2 Claims. (Cl. 18—53)

This invention relates to rubber products.

To derive a rubber capable of being manufactured in sheet form, so as to have all the much desired properties of ordinary sheet rubber, as, for instance, its pliability, its water-shedding characteristic, the property by which it lends itself readily to be formed into bags, articles of clothing, and so forth, and yet to eliminate from such a product the elastic quality, is one of the main phases of the invention herein to be dealt with. It is an object of the invention to provide a product of this character, as well as a method of manufacture by means of which such a product may simply and easily be manufactured.

It is an object of the invention to provide a rubber capable of being manufactured into sheets in substantially the same manner as ordinary rubber, without any substantial change in technique, wherein the sheet, so produced, will have attributes of ordinary rubber sheet, but will be sturdier and tougher than ordinary sheet of the same gauge, without suffering any material change in flexibility. At the same time, elasticity will be eliminated, or, at least, so substantially reduced that it may practically be disregarded where otherwise it would be a deterring factor.

It is an object of the invention to provide a rubber which, in sheet form, is of high flexibility, and yet lends itself very effectually to processing such as stitching by sewing machine or similar processes. This type of processing has not so successfully been effected in the past with fabricated pure rubber sheets, unless such sheets had first been properly backed by some substantial medium such as a textile fabric.

That the incorporation into rubber of different substances is not new is well understood. Materials such as chalk, sulphur and cork have been introduced into rubber, before vulcanization, for many different purposes. Even textile fabrics have been introduced into rubber before vulcanization. Prominent in these compounds are those used for the manufacture of rubber for the fabrication of tires, and of rubber soles and heels. A low degree both of flexibility and of elasticity is one of the main attributes in such cases. Such rubber is substantially valueless for the formation of thin sheets, such as are used in the manufacture of articles of clothing, where the sheet, in the same manner as textile fabrics, must be capable of conforming substantially to the contour of a figure.

In the effectuation of the invention, "washed and dried" rubber, has incorporated into it, by suitable processing, minute, highly flexible, units, such as the filaments found in threads used in making textile fabrics, or very small portions of such filaments. Such units are preferably substantially non-elastic, or, at least, their elasticity is of an order much lower than that of rubber itself. These units, for a substantial degree of success for the invention, are of a high degree of fineness; preferably, also, the effective length of each individual unit is of a very low order.

While the very act of incorporating foreign fibrous substances into rubber has, in the past, been followed by a sharp reduction in the total elasticity of the rubber, just as in the case of introducing materials such as chalk and other filling materials, the incorporation of fibrous material in accordance with the invention, as, for instance, flock, and, especially, cotton or silk flock, results in a very strange phenomenon. The elasticity of such rubber in the direction of extent of the sheet leaving the sheeters was found to have been eliminated substantially entirely or to a very high degree. However, this result was produced without any noticeable loss to the sheet of its property of drapiness, that is, flexibility. Furthermore, the calendering, as well as all the other steps of bringing the sheets produced from the composite mass into commercial condition, was carried on with no, or substantially no change in technique from that exercised in the production of the ordinary rubber sheet as normally manufactured. The reasons for these results have not as yet been determined, but successive lots of material, produced under substantially the same circumstances, have given substantially the same results.

The sheet product of this processing lends itself to stitching substantially in the same manner as textiles, without the requisite backing of a textile or similar means to assure retention of the stitches. The product may be handled readily and effectively in processes and be used for purposes where ordinary rubber could not efficiently be employed.

Other objects of this invention will hereinafter be set forth, or will be apparent from the specific description herein of embodiments for carrying out the invention.

The invention, however, is not intended to be restricted to any particular composition, or article of manufacture, or to any particular combination of components, or to any particular application for such composition, article of manufacture, or combination of components, or to any specific manner of use therefor, or to any process of manufacture therefor, or to any of various details thereof, herein described, as the same may be modified in various particulars or be applied in many varied relations without departing from the spirit and scope of the claimed invention, embodiments herein described being merely illustrative of the various forms in which the invention may appear.

To produce a rubber in accordance with this invention, any suitable commercial rubber, as, for instance, "washed and dried" rubber, may be used. The rubber may be introduced into the processing either in the relatively unmanufactured condition in which it arrives from the plantation or other native source, or may have been advanced through the manufacturing stages to become batched or broken down rubber. For instance, the rubber may have been advanced, from the stage of the crepe type of plantation rubber, through one or more stages of a batching process, to prepare it for efficient processing in accordance with the invention. The batch is worked upon apparatus such as a mixing mill, or a rubber masticator of like effect. The manner of this processing may follow substantially the usual course of manipulation used on mixing mills, especially in the first period where the rubber is broken up and softened for the subsequent processing. While the rubber is feeding through the masticator or mill, and after an interval of about twenty minutes, depending upon the particular batch of rubber, customarily devoted to breaking down the rubber, there is introduced into the mass of rubber, for incorporation thereinto, a quantity of flock. The proportions of flock may be varied in accordance with certain factors in the product desired, as, for instance, the thickness of the sheet intended to be produced, and other factors of commercial importance.

The mixture thus produced is subjected to a sufficient mastication to effect, at this stage, substantially complete incorporation of all the flock into, and uniform distribution of such flock throughout, the rubber. In this masticating operation, other compounds such as coloring matter may be introduced. It was found that, on the mixing mill, fine grinding of the batched rubber and flock assisted in securing substantially uniform distribution, the end point of the mastication being reached by setting the rolls closely up toward each other, in one case so that they were but about one-sixteenth inch apart.

After mastication, while the resultant rubber preferably is given the usual rest, it may immediately, or after such a rest, be removed to the calendar rolls. While ordinary temperatures of calendaring may suffice for the manufacture of a product within certain of the elements of this invention, it has been found that a slight rise in the neighborhood of 10° F. to 20° F. resulted in an appreciable development of the desired properties of the product.

The mass of incorporated rubber and flock is calendared without any material change from the method practiced by skilled calendar crews who determine the condition of the rubber in the customary manner, considering the amount of flock and other introduced compounds. When the calendared mass finally has reached the desired condition, the sheet is removed from the rolls in the usual manner, and made up in readiness for vulcanization.

Even after the mixing operation, the rubber is found to have attained a degree of non-elasticity in the line in which it is removed from the rolls. This characteristic is found to be even more enhanced when the material passes, in its unvulcanized state, from the calendar rolls.

After calendaring and preferably a suitable rest period, the sheet is subjected to vulcanization. In this stage of processing, substantially any suitable method may be followed. However, the acid cure or vapor cure has been found most effective in delivering a rubber having the desired characteristics. After vulcanization, the condition of unelasticity is found to be even more marked, and set in the sheet. However, flexibility is substantially unaffected, whereas toughness appears to be measurably increased. When coloring matter is introduced during processing, it takes effect uniformly and without difficulty. The sheet may be cut and formed into different articles of manufacture, and it may be stitched without hindrance for the production of different articles of manufacture. The stitches hold substantially as if in a textile, and without tearing.

The substance introduced at the mixing mill for the manufacture of this type of rubber may be described as extremely fine fibres, such, for instance, as are found in textile fibres. Such fine fibres may be reduced to an even finer state than the normal condition in commerce, as, for instance, by grinding or by some similar operation. The particular fibres used in preparing certain embodiments in accordance with the invention include fibres of the animal type, such as silk flock, and fibres of the cellulosic type, such as cotton flock, that is, fibres of silk and cotton which had been reduced to a very fine, powdery condition. In fact, this flock is as fine as flour, so fine that the individual fibres are barely, if at all, visible to the naked eye. It has been found that the finer the flock used, the more accentuated are the results secured. Such fineness makes possible the production of very thin sheets without pin holes. Also, the amount of flock introduced was found to be most effective when, into the masticator, there were introduced between eight to twenty parts of flock for each ninety-two to seventy-five parts of rubber and other compounds. Rubber processed in this manner could be calendared into sheets between five one-thousandths and twenty-five one-thousandths of an inch, although only gauges between twelve one-thousandths and twenty one-thousandths were necessary for commercial use. All of these factors can be arrived at without the introduction of any brittleness into the sheet.

Many other changes could be effected in the particular composition set forth, and in the article of manufacture described, and in the methods of operation set forth, and in specific details thereof, without substantially departing from the invention intended to be defined in the claims, the specific description being to illustrate certain features of the invention.

What is claimed as new and useful is:—

1. As an article of manufacture, a sheet of material sufficiently thin and flexible to be capable of being used in the manufacture of articles of clothing and comprising vulcanized rubber having finely divided flock dispersed therethrough in the proportion of about eight to twenty-five parts of flock to about ninety-two to seventy-five parts of rubber, respectively, the resulting material having substantially reduced extensibility in at least one direction and thickness of said sheet not exceeding about twenty-five one-thousandths of an inch.

2. As an article of manufacture, a sheet of material sufficiently thin and flexible to be capable of being used in the manufacture of articles of clothing and comprising calendered and vulcanized sheet rubber having finely divided fibrous material dispersed therethrough in the proportion of about eight to twenty-five parts of flock to about ninety-two to seventy-five parts of rubber, respectively, the resulting material having substantially reduced extensibility in at least one direction of the thickness of said sheet not exceeding about twenty-five one-thousandths of an inch.

ROLAND H. GUINZBURG.